Jan. 22, 1929.
A. L. CHRISTIANSEN ET AL
1,699,951
FISH CUTTING AND CLEANING MACHINE
Filed Feb. 18, 1926
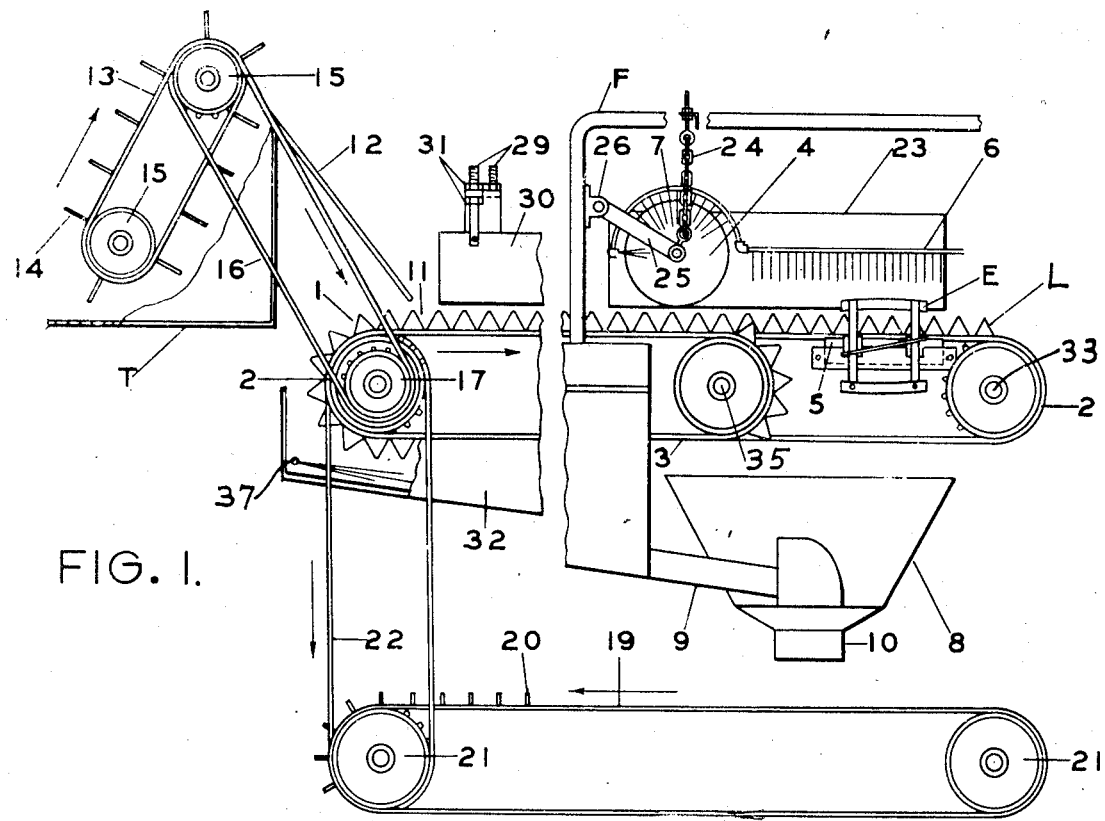
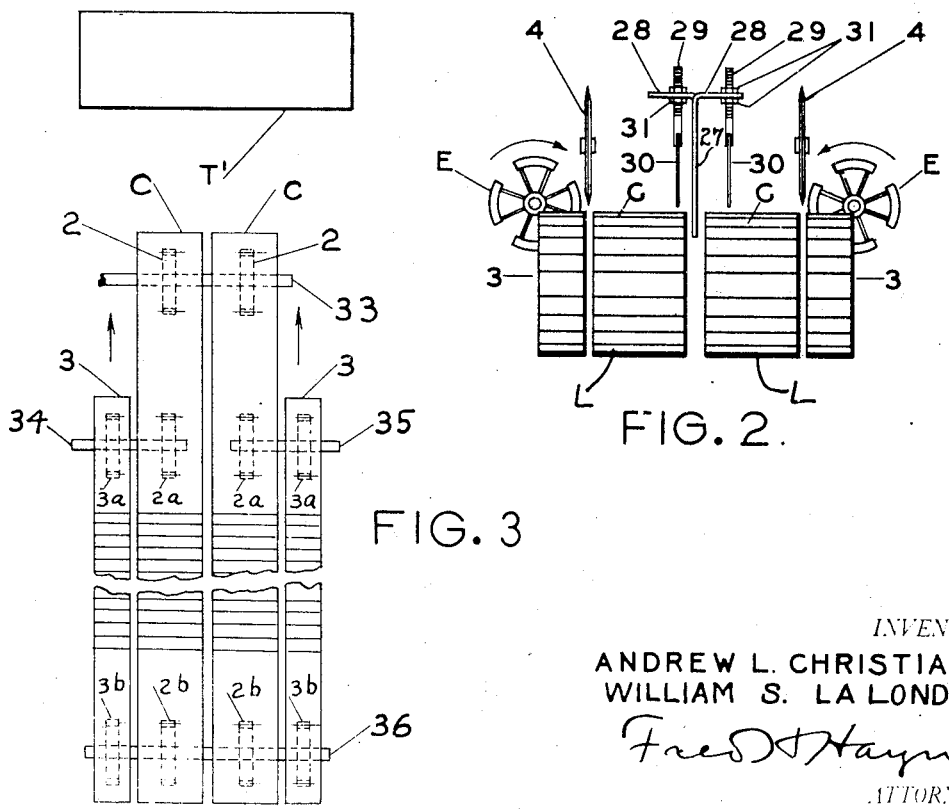
INVENTORS
ANDREW L. CHRISTIANSEN
WILLIAM S. LA LONDE
Fred S. Hayn.
ATTORNEY.

Patented Jan. 22, 1929.

1,699,951

UNITED STATES PATENT OFFICE.

ANDREW L. CHRISTIANSEN, OF WILMINGTON, AND WILLIAM S. LA LONDE, OF LOS ANGELES, CALIFORNIA.

FISH CUTTING AND CLEANING MACHINE.

Application filed February 18, 1926. Serial No. 89,019.

Our invention relates to fish cutting and cleaning machines, being more particularly an improvement on a machine presented in a prior application filed by Andrew L. Christiansen, which application was executed on Jan. 20, 1924.

It is the principal object of our invention to produce a duplex machine which is a marked improvement over that disclosed in the above noted application, whereby the output of said machine will at least be doubled.

A further object of our invention is to associate with our novel machine a set of cutters, and a novel means for adjusting the same whereby the depth of cut of the back bones of the fish may be regulated to a nicety, said cutters, as well as the eviscerators associated with said machine, having a washing means associated therewith whereby not only the fish cut and cleaned are thoroughly washed, but the cutters and eviscerators are also kept clean at all times, the machine being also provided with means for receiving not only the heads and entrails of the fish, but is equipped with means for carrying off the wash water.

A still further object of our invention is to equip our novel machine with a means in the shape of an adjustable plate whereby the fish, when placed in parallel relation on the conveyors, said fish may be adjusted from the tail toward the head, so that said fish may have their heads removed without any waste.

It is also an object of our invention to equip our novel machine with a set of conveyors operated in timed relation with the moving parts of the machine, said conveyors functioning to deliver the fish from a tank, into which they are previously dumped, and on to a table where they are fed manually to the machine, one of said conveyors being positioned below the machine and functioning to carry away the heads and entrails, as well as the wash water, to a distant point, such for example as a trough or tank.

It is also within the province of our invention to provide a novel form of fish conveying system for feeding the fish through the machine, means being provided on said conveyors for supporting both the bodies and heads of the fish, an adjusting mechanism being associated with said conveyors to insure that they are at all times kept in proper alignment.

It is also an object of our invention to provide a novel form of machine which is simple in character, thoroughly reliable and efficient in operation, not easy to get out of order, and one which will thoroughly and reliably effect the objects intended.

Further objects and advantages of our invention will become more apparent as the description thereof proceeds.

Reference is had to the accompanying drawings, in which similar reference characters denote similar parts. In the drawings, Fig. 1 is a more or less diagrammatic, fragmentary, elevational view of our improved machine, Fig. 2 is a fragmentary end elevational view of the machine, certain parts being omitted for the sake of clearness, and Fig. 3 is a fragmentary, diagrammatic plan view of the conveyor system of the machine.

Describing our invention more in detail, it has been found in practice that by providing a set of cutters, as well as a set of eviscerators, adapted to coact with a set of fish conveyors, the output of the machine will be at least doubled. It has also been found to be of material advantage and convenience to provide an automatic means whereby the fish may be conveyed to the table associated with the machine, so that the fish may be quickly and easily fed thereto by the operators of the machine. Further, a conveyor, operated with timed relation with the machine, for carrying away the removed heads and entrails, provides for cleanliness and speed, and has been found in practice to be a great labor saver.

Since the general construction and operation of the machine has been fully described in the hereinbefore mentioned application, and in a patent to Andrew L. Christiansen, #1,539,300, granted May 26, 1925, we have deemed it unnecessary to show a complete machine.

A pair of conveyors C, equipped with cleats L of any preferred construction, but preferably those disclosed in an application of William S. La Londe, Andrew L. Christiansen and William S. La Londe, Jr., which application is executed of even date herewith, which cleats are preferably associated with a means, such as an endless chain, for engaging with a set of sprocket wheels 2, mounted in any desired manner on the frame work F of the machine. The sprocket wheels 2 are operated in timed relation by a set of appliances more particularly described in the hereinbefore mentioned application and patent, the conveyors C having also associated therewith fish holding members or belts, not shown, and also the fish accommodating members for accommodating fish of all sizes, which members have also been omitted for the sake of clearness.

Juxtaposed to the conveyors C, as shown in the drawings, are the fish head supporting members or conveyors 3, for supporting the heads of the fish, as said fish are carried through the machine on the conveyors C to the cutters 4, and thence to the eviscerators E, said fish head supporting members moving in timed relation with the conveyors C, and are accurately positioned in relation thereto, so that the cleats thereon will at all times be maintained in accurate alignment. As seen in Figs. 1 and 3, the fish head supporting members 3 are of shorter length than the conveyors C.

As will be obvious, unless a special means is provided for insuring that the conveyors 3 and C are continually kept in alignment, the fish will not be properly cut and cleaned, and will be crushed or torn apart. To this end we have devised the following construction:

As seen more particularly in Fig. 3, the sprocket wheels 2—2 are mounted upon, and are attached by any suitable means to the shaft 33, positioned upon the discharge end of the machine, and comprise the driving elements for the conveyors C—C. The sprocket wheels 3ª—2ª and 2ª—3ª are mounted upon and attached by any preferred adjustable means to the shafts 34 and 35 respectively, which shafts are associated in any desired manner with the framework of the machine. The chains associated with the conveyors C—C are adapted to travel on, and actuate the sprocket wheels 2ª—2ª. The sprocket wheels 3ᵇ—2ᵇ are all positioned to idle, or operate freely upon the shaft 36, also associated in any preferred manner with the frame work of the machine. When the conveyors C—C are in motion, the sprocket wheels 2ª—2ª are actuated, and in turn operate the shafts 34 and 35, and the sprocket wheels 3ª—3ª, for moving the conveyors 3—3 in unison with the conveyors C—C which construction will insure that the sets of conveyors are continually kept in proper alignment.

As clearly disclosed in the prior application and patent hereinbefore referred to, the framework of the machine has associated therewith an adjustable blade or cutting element 5 in juxtaposition with each eviscerator E, so that when the fish are fed to said eviscerators, since each fish has been given a cut on the lower side thereof by said blades, the eviscerator blades, as said eviscerator is rotated toward said cutting blades, said eviscerator blades will coact with said cutting blades so that the fish may be more expeditiously decapitated, the entrails thereof being removed simultaneously.

To provide for washing the fish, and for maintaining the eviscerators and cutters in a cleanly condition at all times, a suitable piping 6, equipped with valves, if desired, and connected to a source of water, are associated with said eviscerators and cutters, said piping also including a curved portion 7 for discharging sprays of water on the cutters 4. If desired also, the eviscerators and cutters may be enclosed in any preferred form of hood to prevent splashing of the water on the floor or on the machine, such a hood being disclosed in the application filed of even date herewith.

Associated with the machine, and preferably positioned below the eviscerators E, a hopper or receptacle 8 of any preferred construction is provided for receiving the heads and entrails of the fish, as well as the wash water. Associated with the feeding end of the machine, and preferably juxtaposed to the table 11, on each side thereof, is a set of flush tanks 32, equipped, if desired, with any preferred form of screen, said flush tanks receiving the drainage from the fish as they are deposited upon table 11, a set of sprays 37, connected to the piping 6, assisting materially in draining the water to a flush pipe 9 connected in any manner to the hopper or receptacle 8, which hopper is provided with an outlet 10. It will thus be clear that the entrails and heads of the fish will be readily washed down and out through the outlet 10.

Preferably, the machine is positioned in proper proximity with a fish tank T, into which the fish to be cut and cleaned are dumped. Associated with the tank T in any manner preferred, is an inclined plane in the shape of a board or metallic member 12, said board or member having its discharge end positioned in proximity with the table 11. Within the tank T, is a conveyor 13 of any approved type, but preferably comprising an endless chain or belt equipped with cleats or other members 14, said conveyor functioning to carry the fish from the tank T and deposit the same on the inclined board or member 12, upon which they slide to the table 11. The conveyor 13 is moved by means of suitable sprocket wheels or other members 15, mounted upon suitable shafts associated in any preferred manner with the tank T, the upper sprocket wheel 15 being preferably driven by a sprocket wheel or other device 17 mounted upon the shaft 18, and in timed relation with the moving parts of said machine, a chain or belt 16 being used to transmit the movement. It will be understood of course that any other means for conveying the fish from the tank T to the table 11 may in practice be substituted for the construction just described, and still remain within the province of our invention, a mechanism for arranging and positioning the fish as they are fed to the machine being provided, if desired.

It has been found advantageous in practice to provide a means or mechanism for carrying away the matter discharged from the outlet 10 of the hopper or receptacle 8. To this end we have provided another conveyor 19 of any preferred type, positioned below the machine, and below the hopper 8, which conveyor is equipped with cleats or other devices 20 for holding the wash water and the heads and entrails deposited thereon as they are dropped through the outlet 10. The conveyor 19 is mounted upon suitable sprocket wheels or pulleys 21, either one of which is operated in timed relation with the moving parts of the machine, and preferably by means of a chain or belt 22 operated by a sprocket wheel or other device associated with the shaft 18. As will be seen in the drawings, the driving member 22 moves in the direction of the arrow, and the conveyor 19, also moving in the direction of the arrow, discharges the material into the tank T'. As hereinbefore explained also the eviscerators E, as well as the conveyor 13, are operated in the direction of the arrows, and in timed relation with the moving parts of the machine.

In the rear of each cutter, and in juxtaposition with the eviscerators E, are splash plates 23 of any suitable construction, which may be adjusted toward and away from the piping 6 and 7 but since this feature is more clearly disclosed in the application filed at even date herewith no further explanation and description are deemed necessary.

As seen in Fig. 1, the cutters are quipped with a means whereby the depth of cut may be adjusted. The shaft upon which said cutters are adapted to be rotated, are equipped with bars 25 pivoted in any preferred manner as at 26 to the framework F, an adjustable chain or chains 24, anchored to said framework in any preferred manner as by means of the nut and bolt construction depicted in Fig. 1, are provided, so that when said chain or chains are adjusted upwardly or downwardly, the driving mechanism associated with said cutters will be adjusted so that the depth of cut of said cutters may be adjusted to a nicety.

Another extremely important feature of our invention is the means for adjusting the fish transversely of the machine from the tails of the fish toward the heads, to insure that there be none wasted. This construction is shown in Figs. 1 and 2, and comprises a plate 27, mounted in any preferred manner on the framework of the machine, and positioned between the conveyors C, and extending longitudinally of the machine. From the plate 27 extend sets of arms 28, said arms being either integral with said plate, or associated therewith in any manner in practice desired. Said arms are equipped with vertically adjustable screws or other devices 29, which devices are adapted to support in any preferred manner the plates 30, extending longitudinally of the machine, and in parallel relation with the plate 27. By unscrewing the nuts or similar devices 31, the plates 30 may be adjusted toward and away from the conveyors, so that the fish may be adjusted from the tail toward the head, in order that the head only of the fish may be removed, and no more, thereby insuring that there will be no wastage.

The operation of the machine should now be clear. When fish of a certain size are to be cut and cleaned, they are dumped into the tank T, the plates 30 having been previously adjusted toward or away from the fish head supporters 3 so that an accurate cut may be made. See Fig. 2. The motor for operating the machine being now set in motion, the conveyors, cutters, and eviscerators are set in motion, the arrows indicating the direction of movement. The fish are carried upwardly from the tank T and are discharged onto the board or plate 12, and onto the table 11, the operators of the machine placing the fish on the cleats 1.

The heads of the fish being supported on the conveyors 3, said fish are moved forwardly until they reach the cutters 4, which cutters sever the back bones, but leave the membrane connecting the viscera and entrails intact. As soon as the fish reach the blades or cutting elements 5, they are given a slight cut on the bottom thereof, and as soon as they reach the eviscerators E, which revolve toward said cutting elements, each partly cut head receives a blow, which blow whips off the heads and simultaneously pulls out the entrails intact, the heads and entrails being dropped into the receptacle 8, and through the outlet 10 onto the conveyor 19, said conveyor carrying them to and depositing them in the tank T'. The piping 6 with its sprays not only washes each fish, but keeps the eviscerators and cutters clean, the drainage water from the receptacles 32 being flushed off by the sprays therein to the pipes 9, and into the hopper 8, being carried through the outlet 10 to the conveyor 19.

While we have thus described our invention with great particularity, it will be clear that the same may be modified throughout a wide range. We therefore do not propose to be limited to the exact details of construction shown and described, but reserve the right in practice to make any and all modifications thereof that fall within the scope of the appended claims.

We claim as our invention:

1. In a fish cutting and cleaning machine wherein means are provided for washing the cutters thereof and each fish, the combination of a set of conveyors arranged in parallel relation, rotary cutters juxtaposed to said conveyors and adapted to sever partly the heads of each fish, an eviscerator for removing the heads and entrails of each fish, means for vertically adjusting said cutters to vary the depth of cut of each fish, means for conveying the fish to said conveyors, vertically suspended means associated with said conveyors for positioning the fish with respect to their tails, and means for conveying away the entrails and heads of said fish.

2. In a duplex fish cutting and cleaning machine wherein means are provided for conveying the fish to said machine, and for cutting, cleaning and washing each fish, as well as conveying away the fish heads and entrails of the decapitated fish, the combination of a set of conveyors for positioning and supporting the heads of each fish, vertically suspended adjustable means associated with said conveyors for adjusting the fish from tail to head, and means associated with said machine whereby all the moving parts thereof are moved in timed relation.

3. In a fish cutting and cleaning machine, in combination with a set of fish conveyors, a set of rotary cutters for severing the back bones of each fish, a shaft associated with said cutters, means for pivoting said shaft to the framework of the machine, and means associated with said shaft whereby said shaft may be raised or lowered so that the depth of cut by said cutters may be adjusted.

4. An adjustable means for a set of rotary cutters adapted for special use in connection with a fish cutting and cleaning machine, said means comprising a pivoted shaft upon which said cutters are adapted to be rotated, one or more chains associated with said shaft, and means associated with the framework of said machine whereby said chain may be raised or lowered so that the depth of cut made by said cutters may be adjusted.

5. In a fish cutting and cleaning machine equipped with a cutter and an eviscerator, in combination, a fish washing and draining system, comprising a set of tanks in juxtaposition with said machine for receiving the drainage of the fish as they are fed to said machine, a set of sprays for washing the fish, the fish cutting and eviscerating devices associated with said machine, an adjustable splash plate for confining the water on the cutter and on the eviscerator, sprays in said tanks for assisting in draining and washing said tanks, and a hopper for receiving the heads, entrails, and drainage from said tanks.

6. In a fish cutting and cleaning apparatus wherein a conveyor is provided for conveying the fish to a fish cutting and cleaning machine, and means are provided for carrying away the heads and entrails of the decapitated fish, the combination of a pair of conveyors equipped with cleats for holding the fish, a fish head supporting conveyor also equipped with cleats juxtaposed to each of said conveyors for supporting the heads of the fish, means associated with all of said conveyors for insuring that said cleats are continually positioned in alignment so that the fish will not be mutilated, and means associated with said machine and said conveyors for moving all the moving parts in timed relation.

7. In a fish cutting and cleaning machine, a set of conveyors, and means positioned between said conveyors whereby the fish may be adjusted in a direction from the tails toward the heads, substantially as described.

8. A fish adjusting means adapted for special use in connection with a fish cutting and cleaning machine, a plate extending longitudinally of said machine, and means associated with said plate whereby said plate may be adjusted transversely of said machine in order that said fish may be adjusted from their tails toward their heads.

9. A fish adjusting means adapted for special use in connection with a fish cutting and cleaning machine, a plate for adjusting said fish transversely of said machine, and a set of adjustable arms associated with said plate for adjusting the same.

10. In a duplex fish cutting and cleaning machine, in combination, a set of fish conveyors, means associated with said machine for decapitating and eviscerating the fish, and an adjustable plate positioned between said conveyors for adjusting the fish transversely of said machine.

11. In a duplex fish cutting and cleaning machine, in combination, a set of fish conveyors, a set of adjustable cutters juxtaposed to said conveyors and adapted to be rotated longitudinally toward and away from said conveyors, a set of eviscerators adapted to be rotated transversely toward and away from said conveyors, and means associated with said machine for operating all its moving parts in timed relation.

12. A fish conveyor system for a fish cutting and cleaning machine, in combination, a set of conveyors, at least two of said conveyors being adapted for carrying the fish through said machine, at least two of said conveyors being adapted to support the heads of the fish, and adjustable means associated with said conveyors whereby said conveyors may be kept in perfect alignment so that the fish may not be crushed.

In testimony whereof we have signed our names to this specification.

ANDREW L. CHRISTIANSEN.
WILLIAM S. LA LONDE.